US008813102B2

(12) United States Patent
Kim et al.

(10) Patent No.: US 8,813,102 B2
(45) Date of Patent: Aug. 19, 2014

(54) METHOD AND APPARATUS FOR GENERATING MASHUP GRAPH, AND METHOD AND APPARATUS FOR RECOMMENDING MASHUP SERVICE

(75) Inventors: Hyoung-shick Kim, Suwon-si (KR); Seong-ho Cho, Seoul (KP); Dong-shin Jung, Suwon-si (KR); Won-seok Kwon, Suwon-si (KR); Ho-yeon Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1577 days.

(21) Appl. No.: 12/370,132

(22) Filed: Feb. 12, 2009

(65) Prior Publication Data
US 2009/0235285 A1    Sep. 17, 2009

(30) Foreign Application Priority Data

Feb. 22, 2008  (KR) .................. 10-2008-0016357
Aug. 22, 2008  (KR) .................. 10-2008-0082456

(51) Int. Cl.
G06F 3/00    (2006.01)
G06F 9/46    (2006.01)
G06F 13/00   (2006.01)

(52) U.S. Cl.
USPC ........... 719/328; 719/330; 719/313; 719/318; 719/319

(58) Field of Classification Search
None
See application file for complete search history.

(56) References Cited

U.S. PATENT DOCUMENTS

2006/0148495 A1*  7/2006  Wilson .......................... 455/466
2008/0288965 A1*  11/2008  Grechanik et al. ............ 719/328

OTHER PUBLICATIONS

Greedy Algorithms, "Spanning Tree and Minimum Spanning Tree", Jan. 10, 2005, Kent.edu, pp. 1-4.*
Christian Schwarzer, Matlab RBN Using the Toolbox—Matrix Representation, Jan. 1, 2003, pp. 1-3.*
API Directory—ProgramableWeb, May 29, 2007, ProgramableWeb, pp. 1-2.*

* cited by examiner

Primary Examiner — H S Sough
Assistant Examiner — Craig Dorais
(74) Attorney, Agent, or Firm — Sughrue Mion, PLLC

(57) ABSTRACT

Provided are a method and apparatus for generating a mashup graph. The method includes receiving a set of services and collecting application programmable interfaces (APIs) of the services, and generating a mashup graph by using the collected APIs according to information regarding connections between the APIs and weights between the APIs. Thus, a mashup graph having a simple form in which a user's preference can be reflected can be generated, instead of a complicated connection matrix.

17 Claims, 8 Drawing Sheets

Related Art

FIG. 2

SERVICE : A  B  C  D

APIs : ①  ②③  ④  ⑤⑥

CONNECTION MATRIX :

|   | 1 | 2 | 3 | 4 | 5 | 6 |
|---|---|---|---|---|---|---|
| 1 |   | Y | Y | Y | Y |   |
| 2 |   |   |   | Y | Y |   |
| 3 |   |   |   | Y | Y | Y |
| 4 |   | Y |   |   | Y |   |
| 5 | Y | Y | Y | Y |   |   |
| 6 |   |   |   | Y |   |   |

5 : (4, 5), (1, 5) = 8
1 : (5,1), (4, 5) = 6
6 : (4, 6), (5, 4), (1, 5) = 6
4 : (5, 4), (1, 5) = 4
5 : (1, 5), (4, 1) = 4
1 : (4, 1), (5, 1) = 2
1 : (4, 1), (5, 4) = 2

METHOD AND APPARATUS FOR GENERATING MASHUP GRAPH, AND METHOD AND APPARATUS FOR RECOMMENDING MASHUP SERVICE

CROSS-REFERENCE TO RELATED PATENT APPLICATION

This application claims priority from Korean Patent Applications Nos. 10-2008-0016357 and 10-2008-0082456, filed on Feb. 22, 2008 and Aug. 22, 2008, in the Korean Intellectual Property Office, the disclosures of which are incorporated herein in its entirety by reference.

BACKGROUND OF THE INVENTION

1. Field of the Invention

Methods and apparatuses consistent with the present invention relate to an open application programmable interface (API) service, and more particularly, to generating a mashup graph between various open APIs, and recommending mashup service.

2. Description of the Related Art

By virtue of the development of the Internet, a new type of Web-based data integration application field referred to as mashup has been developed. Mashup refers to a Web site or application in which contents provided by a plurality of services are integrated with each other. In particular, mashup emphasizes user interactive participation, and collects and reconstitutes information if necessary.

In more detail, mashup refers to mixing and matching contents and services provided by a site and then making more valuable contents and services. For example, FIG. 1 illustrates a mashup 110 in which a map service of Google is connected to a photograph service of Flickr. In this case, the mashup 110 is configured so that photographs of locations related to a predetermined location are displayed on a map when a user clicks the predetermined location of the map. The hypertext markup language (HTML) 120 of the mashup 110 is illustrated on the right side of FIG. 1.

In order to author a mashup, a developer of the mashup plans a type of mashup, searches for and selects open APIs used for making the planned mashup. For example, when the developer of the mashup plans to make a mashup service using an open Google Maps API and an open Flickr API, the developer analyzes the open Google Maps API and the open Flickr API so as to understand the properties of the open Google Maps API and the open Flickr API, such as a communication protocol, data format and a form of input/output data. An open API service provider generates and provides information regarding user's account or a user authentication key to the developer of the mashup, thereby starting the making of the mashup.

During the planning of the mashup, i.e., the user's searching and selecting of the open APIs, a user needs to know whether the APIs provided by the services, as illustrated in FIG. 2, can be connected to each other. In order to decide whether the mashup is feasible, it is assumed that information regarding an input/output connection between the services illustrated in FIG. 1 and the open APIs can be stored and calculated via a predetermined function of a predetermined system.

As illustrated in FIG. 2, four web sites A through D provide six open APIs ① through ⑥, and mashup can be constructed using the six APIs ① through ⑥.

FIG. 2 illustrates a connection matrix between conventional mashup services. Referring to FIG. 2, when services $S(1), S(2), \ldots, S(k)$ are selected according to a sequence selected by a user via a user interface, the service $S(1)$ is determined as a base service, and the output of each of the services $S(i)$, except for the service $S(1)$, is tested in terms of whether each of the services $S(i)$ can be connected to the services $S(1), S(2), \ldots, S(i-1)$. If the output of each of the services $S(i)$, except for the service $S(1)$, can be connected to the $S(1)$, services $S(2), \ldots, S(i-1)$, the result is stored. Then, this operation is sequentially repeated from service $S(2)$ to service $S(k)$. In this case, only a mashup determined according to a user's selection can be obtained, a user's preference and a predetermined request cannot be reflected, and the mashup is highly complicated in terms of time and space.

SUMMARY OF THE INVENTION

The present invention provides a method and apparatus for generating a mashup graph having a simple form and in which a user's preference can be reflected, instead of a complicated connection matrix.

The present invention also provides a method and apparatus for recommending a mashup service in which a feasible combination of a mashup is calculated and a user's predetermined request and preference are reflected when a user selects a set of services in order to constitute the mashup.

According to an aspect of the present invention, there is provided a method of generating a mashup graph, the method comprising: receiving a set of predetermined services and collecting APIs of the services; and generating a mashup graph by using the collected APIs, according to information regarding the connections between the APIs and weights between the APIs.

According to another aspect of the present invention, there is provided an apparatus for generating a mashup graph, the apparatus comprising: an interface collection unit which receives a set of predetermined services and collecting APIs of the services; an input/output connection test engine which stores and outputs information regarding the connections between the APIs and weights between the APIs; and a mashup graph generating unit which generates a mashup graph by using the collected APIs, according to the information regarding the connections and the weight, which is provided by the input/output connection test engine.

According to another aspect of the present invention, there is provided a method of recommending a mashup graph, the method comprising: receiving a set of predetermined services and collecting APIs of the services; and generating a mashup graph by using the collected APIs, according to information regarding the connections between the APIs and weights between the APIs; calculating maximum weight spanning trees in which the sum of weights is the greatest in the generated mashup graph; and selecting and calculating a maximum weight spanning tree in which a user's request is reflected, from among the maximum weight spanning trees, and outputting a calculated result as a mashup list.

According to another aspect of the present invention, there is provided an apparatus for recommending a mashup graph, the apparatus comprising: an interface collection unit which receives a set of predetermined services and collects APIs of the services; a mashup graph generating unit which generates a mashup graph by using the collected APIs, according to information regarding the connections between the APIs and weights between the APIs; and a authoring engine which calculates maximum weight spanning trees in which the sum of weights is the greatest in the generated mashup graph, selects and calculates a maximum weight spanning tree in which a user's request is reflected, from among the maximum weight spanning trees, and outputs a calculated result as a mashup list.

According to another aspect of the present invention, there is provided an apparatus for recommending a mashup graph, the apparatus comprising: an interface collection unit which receives a set of predetermined services and collecting APIs of the services; a mashup graph generating unit which generates a mashup graph by using the collected APIs, according to information regarding the connections between the APIs and weights between the APIs; and an authoring engine which calculates maximum weight spanning trees in which the sum of weights is the greatest in the generated mashup graph, selects and calculates a maximum weight spanning tree in which a user's request is reflected, from among the maximum weight spanning trees, and outputs a calculated result as a mashup list.

According to another aspect of the present invention, there is provided a computer readable recording medium having recorded thereon a program for executing the above methods.

According to embodiments of the present invention, the relationship and the weights between open APIs are expressed as a mashup graph, a mashup service in which a user's request is reflected is recommended, and thus, a feasible mashup combination between services is calculated and provided, a mashup combination is calculated according to a user's request with respect to a predetermined service, thereby providing a service list according to a feasible combination of services and a mashup combination.

BRIEF DESCRIPTION OF THE DRAWINGS

The above and other aspects of the present invention will become more apparent by describing in detail exemplary embodiments thereof with reference to the attached drawings in which:

FIG. 2 illustrates a connection matrix between related art mashup services;

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
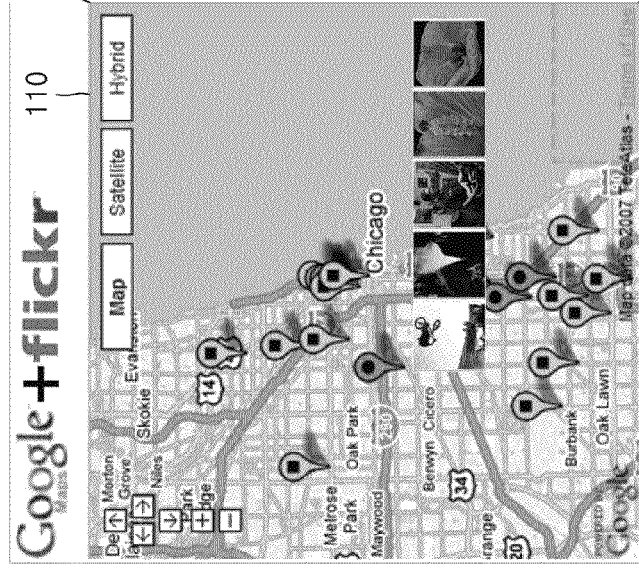
FIG. 1 illustrates a connection matrix between related art mashup services.
Figure 3:
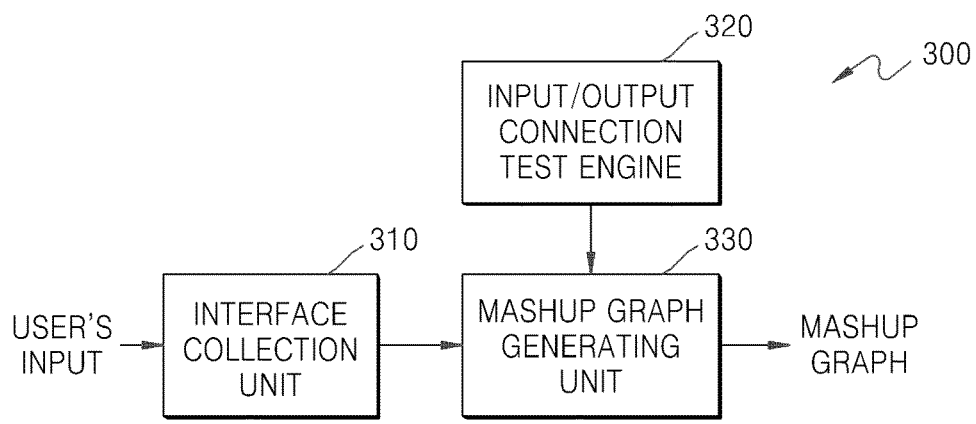
FIG. 3 is a schematic block diagram of a mashup graph generating apparatus according to an exemplary embodiment of the present invention.
Figure 4:
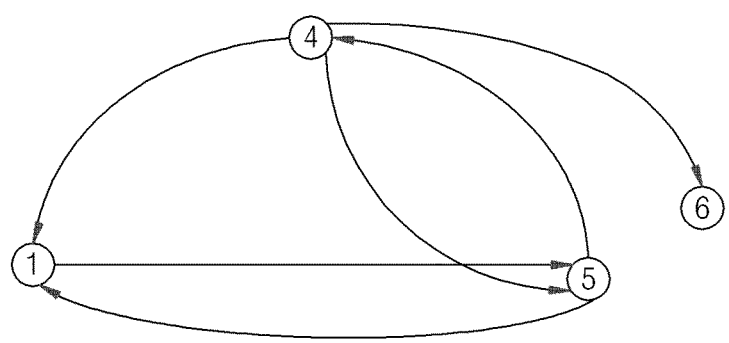
FIG. 4 illustrates a mashup graph according to an exemplary embodiment of the present invention.
Figure 5:
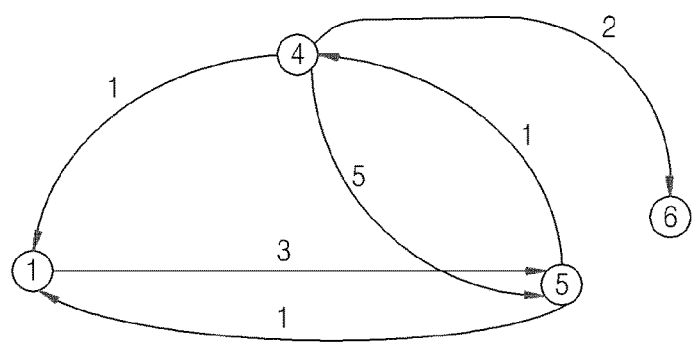
FIG. 5 illustrates a mashup graph according to another exemplary embodiment of the present invention FIG.

FIG. 3 is a schematic block diagram of a mashup graph generating apparatus 300 according to an exemplary embodiment of the present invention. FIGS. 4 and 5 illustrate mashup graphs, according to exemplary embodiments of the present invention.

Referring to FIG. 3, the mashup graph generating apparatus 300 includes an interface collection unit 310, an input/output connection test engine 320, and a mashup graph generating unit 330.

The mashup graph generating apparatus 300 collects APIs of services from a set of predetermined services that are input by a user, and generates a mashup graph by using the collected APIs, according to the connections or disconnections between the APIs and weights between the APIs.

The interface collection unit 310 receives the set of predetermined services that are input by a user, and collects the APIs of the services.

The input/output connection test engine 320 stores information regarding the connections and weights between the APIs, and outputs the information to the mashup graph generating unit 330. The input/output connection test engine 320 may previously store the information regarding the connections between the APIs. In addition, the input/output connection test engine 320 may selectively calculate the information regarding the connections between the APIs via a predetermined function. The weight is determined according to a user's frequency in use of a service, a general frequency in use of a service, a recommended value of a service, etc. The mashup graph generating unit 330 receives the information regarding the connections and the weights between the APIs, from the input/output connection test engine 320, and generates a mashup graph by using the APIs collected by the interface collection unit 310, according to the information regarding the connections and the weights between the APIs.

Referring to FIGS. 3 and 4, the mashup graph generating apparatus 300 utilizes edge information from services A though D or APIs ① through ⑥ in order to generate a mashup graph. The edge information includes information regarding the connections or disconnections between the APIs ① through ⑥, for example, the connections or disconnections between a Google Maps API and a Flickr Photo API. In addition, the edge information includes weights between the APIs. In this regards, the weight is determined according to a user's frequency in use of a service, a general frequency in use of a service, a recommended value of a service, etc. For example, the weight may be dynamically changed according to a user's frequency in use, general frequency and recommended value of a mashup in which the Google Maps API is connected to the Flickr Photo API. Thus, the mashup graph generating apparatus 300 may generate a simple type of graph indicating not only the connections between APIs, but also a feasible mashup combination in which a user's preference, etc., are reflected.

Referring to FIG. 4, services A through D, APIs ① through ⑥ provided by the services A through D, and a mashup graph indicating the feasible mashup combination are provided.

The services A through D may each be a service provider or a web page (e.g., Google, Yahoo, Flickr, etc.).

The APIs ① through ⑥ are provided by the services A through D. The service A provides API ①, the service B provides the APIs ② and ③, the service C provides the API ④ and the service D provides the APIs ⑤ and ⑥. In particular, the APIs ① through ⑥ are open APIs, such as a Google Maps API used for incorporating interactive maps of Google and data into a user's web site, a YouTube Data API used for incorporating YouTube video data into the user's web site, and a Google Checkout API used for selling products in the user's web site.

FIG. 4 illustrates the mashup graph generated by the mashup graph generating apparatus 300 of FIG. 3. For example, when a user selects a set of predetermined services (e.g., A, C and D), connections between the APIs ①, ④, ⑤ and ⑥ that can be constructed using a mashup according to the selected services are clearly illustrated. That is, with respect to the API ①, the API ④, the API ⑤ and the API ⑤ to the API ④ may be connected to the API ①.

FIG. 5 illustrates a mashup graph generated by the mashup graph generating apparatus 300 of FIG. 3. The mashup graph of FIG. 5 is different from the mashup graph of FIG. 4 in that the weights between the APIs are indicated as 1, 2, 3 and 5. The weight is determined according to a user's frequency in use of a service (or API), a general frequency in use of a service (or API), a recommended value of a service (or API), or the like. For example, the weight may be dynamically changed according to a user's frequency of use, general frequency of use and recommended value of a mashup in which a Google Maps API is connected to a Flickr Photo API. That is, the weight may be dynamically changed according to a user's frequency of use, a general frequency of use or a recommended value of a predetermined service or a predetermined API.

For example, when the API ⑤ is a Google Maps API of Google, and the API ④ is a Yahoo Search API of Yahoo, a weight of a mashup in which the Yahoo Search API is connected to the Google Maps API is five, and thus, is the highest weight. The weight may be dynamically determined and updated according to a user's frequency of use, a general frequency of use and a recommended value of a mashup in which the Yahoo Search API is connected to the Google Maps API.

According to the above exemplary embodiments of the present invention, a mashup graph can clearly indicate not only information regarding the connections or disconnections between APIs, according to a user's selection, but also a feasible mashup combination in which a user's preference is reflected, in terms of time and space.

Figure 6:
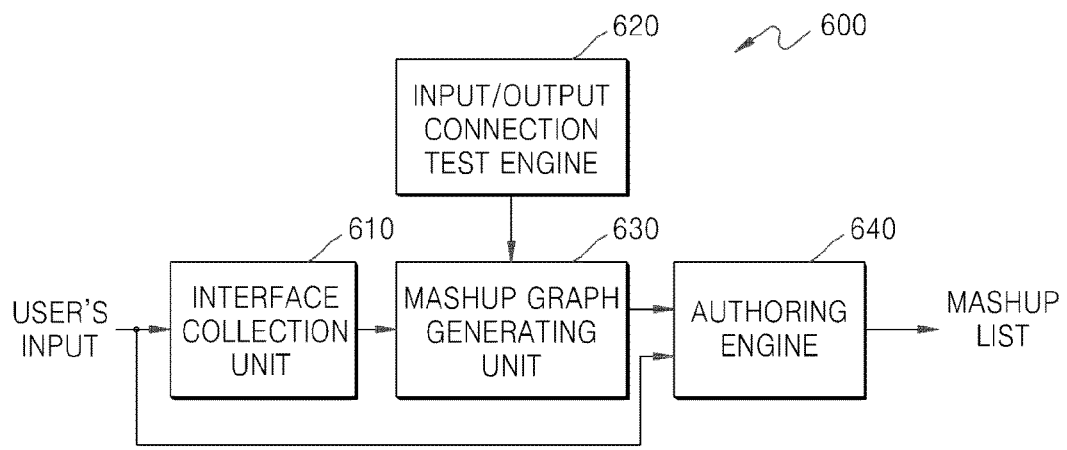
FIG. 6 is a schematic block diagram of a mashup recommendation apparatus according to an exemplary embodiment of the present invention.

FIG. 6 is a schematic block diagram of a mashup recommendation apparatus 600 according to an exemplary embodiment of the present invention.

The mashup recommendation apparatus 600 includes an interface collection unit 610, an input/output connection test engine 620, a maximum weight spanning tree calculation unit 1000 and an authoring engine 640.

The interface collection unit 610 receives a set of predetermined services that are input by a user, and collects APIs of the services.

The mashup graph generating unit 630 generates a mashup graph by using the APIs collected by the interface collection unit 610, according to information regarding the connections or disconnections between the APIs and weights between the APIs. The information regarding the connections or disconnections between the APIs and the weights between the APIs may be provided from the input/output connection test engine 620. The input/output connection test engine 620 may previously store the information regarding the connections or disconnections between the APIs. In addition, the input/output connection test engine 620 may selectively calculate the information via a predetermined function. The weight is determined according to a user's frequency of use of a service, a general frequency of use of a service, a recommended value of a service, etc.

The authoring engine 640 calculates maximum weight spanning trees in which the sum of weights is the greatest in the generated mashup graph, selects and calculates a maximum weight spanning tree in which a user's request is reflected, from among the maximum weight spanning trees, and outputs the calculated result as a mashup list. The detailed function of the authoring engine 640 will be described with reference to FIGS. 7 and 8.

Figures 7, 8:
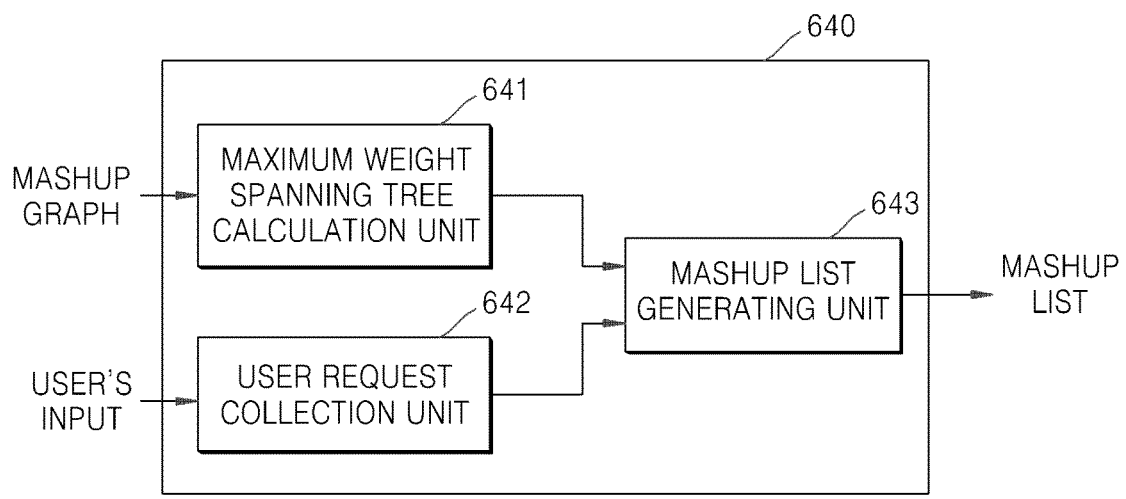
FIG. 7 is a schematic block diagram of an authoring engine illustrated in FIG. 6, according to an exemplary embodiment of the present invention.
FIG. 8 is a view for illustrating a function of a maximum weight spanning tree calculation unit illustrated in FIG. 7, according to an exemplary embodiment of the present invention.

FIG. 7 is a schematic block diagram of the authoring engine 640 illustrated in FIG. 6, according to an exemplary embodiment of the present invention.

Referring to FIG. 7, the authoring engine 640 includes a maximum weight spanning tree calculation unit 641, a user request collection unit 642 and a mashup list generating unit 643.

The authoring engine 640 calculates maximum weight spanning trees in which the sum of weights is the greatest in the mashup graph that is generated by the mashup graph generating unit 630. A maximum weight spanning tree is a tree in which the sum of weights is the greatest in the mashup graph, and is a path along which the APIs are connected.

FIG. 8 illustrates the calculated result of the maximum weight spanning trees obtained by calculating the maximum weight of the mashup graph illustrated in FIG. 5, according to an exemplary embodiment of the present invention.

Referring to FIGS. 5 and 8, with respect to the API ⑤, the sum of weights for the API ④ to API ⑤ and the API ① to API ⑤ is 8, and the sum of weights for API ① to API ⑤ and the API ④ to API ① is 4. Likewise, with respect to the APIs, all feasible trees are calculated. In this regard, the trees are calculated in a predetermined sequence. In FIG. 8, the trees are arranged in descending order so that a tree having a higher sum of weights is followed by a tree having a lower sum of weights. With respect to the APIs, the number of cases with regard to the trees may be large, based on a single API or a plurality of APIs, and thus FIG. 8 is only for illustrative purposes.

The user request collection unit 642 collects a user's request via a user's input, and provides the user's request to the mashup list generating unit 643. The user's request includes the length of a mashup service, the maximum degree of a mashup service, the number of mashup services, information regarding an inclusion or an exclusion of a predetermined service, the sequence of predetermined services, etc. For example, a user may construct a mashup so that a Yahoo Search API should be included in services providing a search API, wherein the categories of the services include weather, search, shopping, etc. In addition, the user may fix the number of mashup services. In this regard, the user may constitute a mashup by using only Yahoo and Google, or alternatively may select a mashup so that the Yahoo Search API is followed by the Google Maps API. According to the above exemplary embodiments of the present invention, in a method and apparatus for recommending mashup services, feasible mashup graphs are generated using APIs provided by a set of services selected by a user, a mashup graph in which a user's preference is reflected can be indicated using the weights of the mashup graph, and mashup services suited to a user's predetermined request can be recommended.

The mashup list generating unit 643 selects and calculates a maximum weight spanning tree in which a user's request is reflected, from among the calculated maximum trees, and outputs the calculated result as a mashup list. The user's request may be converted to have the property of a tree and may be processed. That is, the above-described examples of the user's request may be converted into components of a tree. For example, when the user's request is a request importing that a predetermined API should be included, a tree in which the predetermined API should be included in the generated mashup graph is selected and calculated. In addition, the selected trees are converted into substantial mashup services and are output as a final mashup list.

Figure 9:
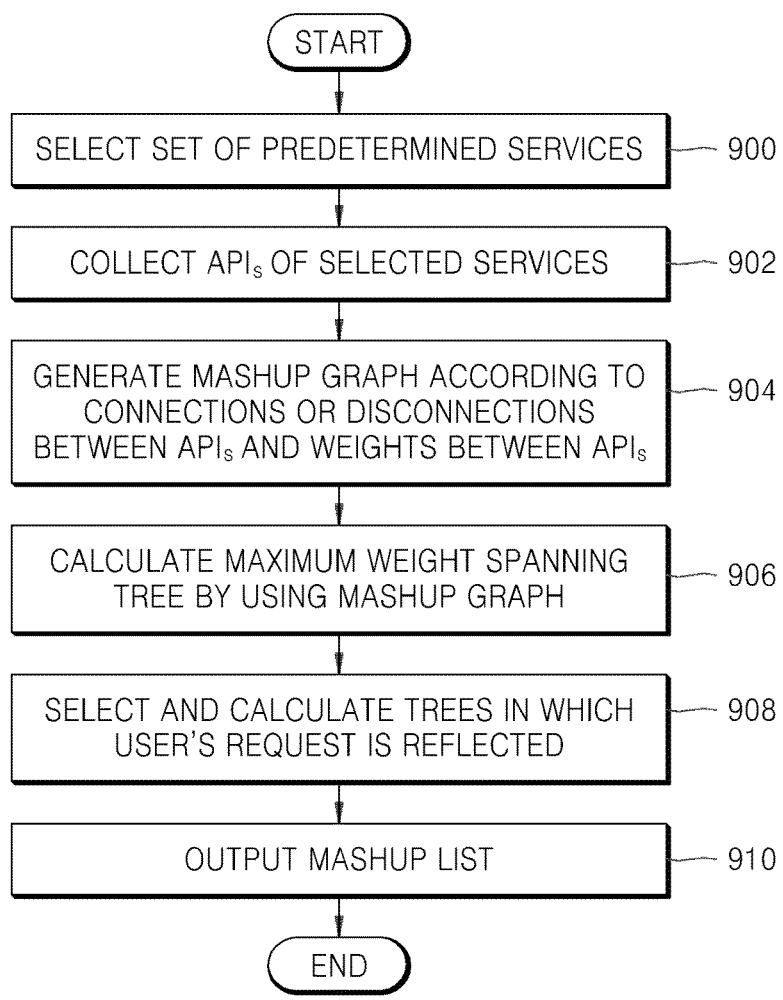
FIG. 9 is a flowchart of a method of recommending mashup services, according to an exemplary embodiment of the present invention.

FIG. 9 is a flowchart of a method of recommending mashup services, according to an embodiment of the present invention.

First, in operation 900, a user selects a set of predetermined services. For example, the user selects Google and Yahoo services. In operation 902, APIs of the selected services are collected. That is, APIs provided by Google and APIs provided by Yahoo are collected. In operation 904, a mashup graph is generated according to the connections or disconnections between the collected APIs and a weight between the collected APIs. In operation 906, maximum weight spanning trees are calculated using the generated mashup graph. In operation 908, only a tree in which a user's request is reflected is selected and calculated, from among the maximum weight spanning trees. Operations 906 and 908 may be simultaneously performed. In operation 910, a mashup list is output as a final result.

Figure 10:
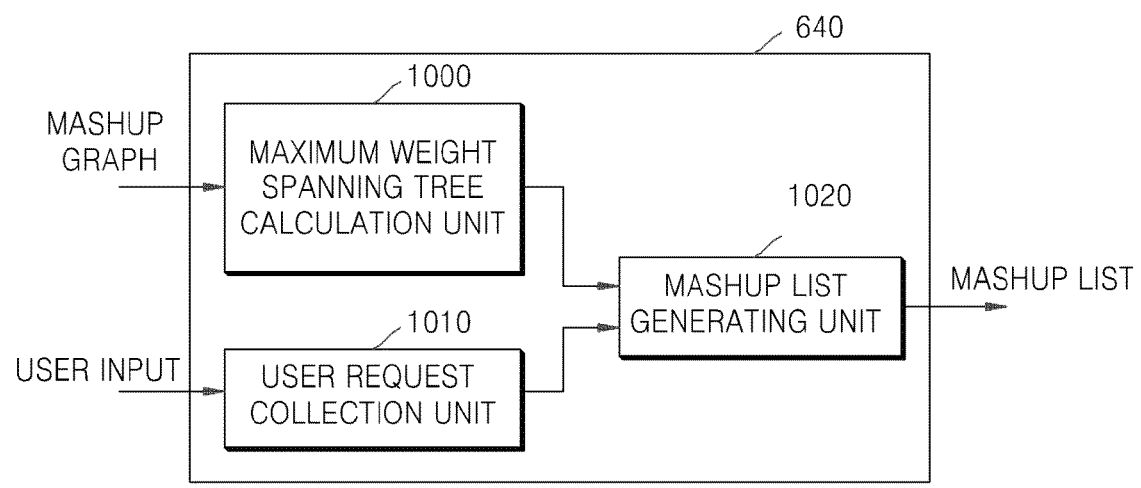
FIG. 10 is a schematic block diagram of an authoring engine, according to another exemplary embodiment of the present invention.

FIG. 10 is a schematic block diagram of an authoring engine 640, according to another exemplary embodiment of the present invention.

Referring to FIG. 10, the authoring engine 640 includes a minimum weight spanning tree calculation unit 1000, a user request collection unit 1010 and a mashup list generating unit 1020.

The authoring engine 640 of FIG. 10 is different from the authoring engine 640 of FIG. 6 in that weights of an edge reflects an inverse number of a user's preference in a mashup graph expressing a mashup relationship. When a user's request exists in the mashup graph, a mashup graph having the simplest configuration and corresponding to the user's request by calculating minimum weight spanning tress in which the sum of the weights is smallest so as to correspond to the user's request and then selecting and calculating a minimum spanning tree by using a prim's algorithm.

Figure 11:
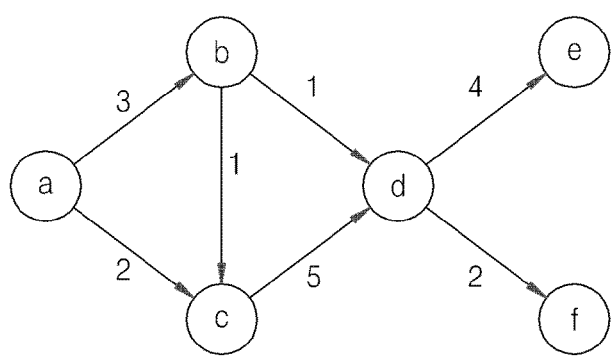
FIG. 11 illustrates connection between mashup services, according to an exemplary embodiment of the present invention.

Referring to FIG. 11, nodes a through f may each be, for example, a map service of Google, a map service of Yahoo, a photograph service of Flickr, etc. Google, Yahoo and Flickr edges are connected so as to have directivity when web services are connected to previous web services. In addition, weights of the edges reflect a user's preference. In this case, an inverse number of the user's preference is applied to the weights. A prim's algorithm is an algorithm of a graph theory selecting and calculating a minimum spanning tree in the mashup graph. The minim spanning tree is a partial graph in which the sum of weights is smallest from among minimum weight spanning trees. The partial graph having the minimum sum of weights needs to be a tree.

The minimum weight spanning tree calculation unit 1000 calculates minimum weight spanning trees in which the sum of weight is the smallest in a mashup graph generated by the mashup graph generating unit 630 of FIG. 6. The minimum weight spanning tree is a tree in which the sum of weights is the smallest in the mashup graph, and is a path along which the APIs are connected. In this case, an inverse number of the user's preference is applied to the weights of edges. When a user's preference is high, for example, when a user prefers to a map service of Google to a photograph service of Flickr, a low weight is applied to an edge connecting a map service of Google to a photograph service of Flickr.

The user request collection unit 1010 collects a user's request via a user's input, and provides the user's request to the mashup list generating unit 1020. The user's request may include various types. A user wants that various types of mashup services are recommended with respect to an individual service, a category or a service and a category. For example, a list, a direct relationship, an order, or a combination of at least one of foregoing may be suggested with respect to the individual service, the category or the service and a category may be suggested. In addition, the user's request does not exist.

The mashup list generating unit 1020 applies a prim's algorithm to the minimum weight spanning tree calculated by the minimum weight spanning tree calculation unit 1000, and outputs the applied result as a mashup list. In this case, the mashup list generating unit 1020 receives the user's request of the user request collection unit 1010 and generates the mashup list in which the user's request is reflected. Hereinafter, a method of generating the mashup list will be described when a list, a direct relationship, an order, or a combination of at least one of foregoing is suggested with respect to the user's request, that is, an individual service, a category, or a service and a category.

First, the case where a user simply suggests a list with respect to a service, a category or a combination thereof will be described. For example, a user's request may be indicated by suggesting an individual service list such as a map service of Yahoo Maps and a weather service of Yahoo, or a category such as a map, weather, a schedule, etc., or a combination of the individual service and the category. In this case, the mashup list generating unit 1020 may convert the list into an order that can connect the services. That is, when the weather service of Yahoo can be followed by the map service of Yahoo from an order point of view, the list may be converted to a relation of the order. After the list is converted into the relation of the order, a mashup list in which a prim's algorithm is applied is generated.

Second, when a user suggests a direct relation, an algorithm is organized as follows. First, when an order between services is set, whether connection satisfying an order between services can be performed is checked. Then, when the connection satisfying the order between services can be performed, the services are connected. While a prim's algorithm is applied to generated trees and possible minimum spanning trees are calculated, a recommendation list of possible mashup services is generated.

Figure 12:
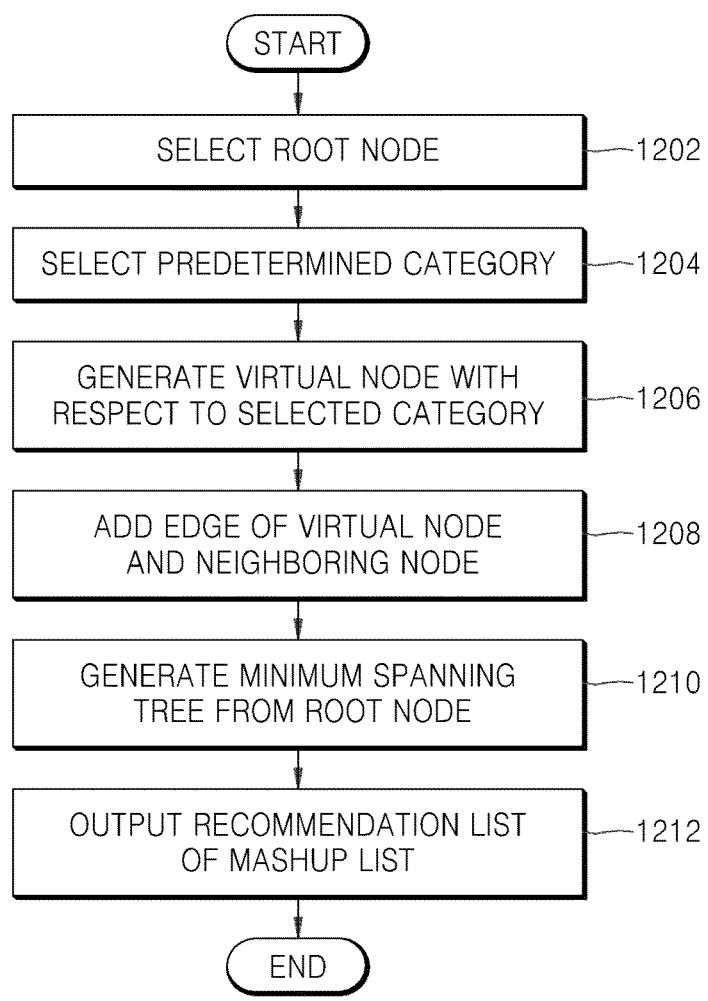
FIG. 12 is a flow chart of a method of generating a virtual node, according to an exemplary embodiment of the present invention.

In addition, when a user sets a category, a virtual node is generated and a minimum spanning tree is generated. Hereinafter, when a user sets a category, a method of generating a virtual node corresponding to the category and generating a mashup list will be described with reference to FIG. 12.

In operation 1202, a root node for a mashup service is selected from a user's input. In this case, a user requests predetermined categories. In operation 1204, a predetermined category is selected. In operation 1206, a virtual node is generated with respect to the selected category. In operation 1208, an edge connecting the generated virtual node to a neighboring node is added. In this case, when a service included in categories can be connected, the edge is added. In addition, a weight of the edge is selected as a minimum weight from an original edge. In operation 1210, the virtual node is generated, and then a minimum spanning tree is generated from a root node. In addition, the virtual node is substituted by a service belonging to the category in a spanning tree. At this time, a link is substituted by an edge on the minimum spanning tree. Operations 1202 through 1210 are repeated until the user's request is satisfied. In operation 1212, a recommendation list of a mashup service is generated.

When a circulation path is generated by generating a virtual node, relaxation algorithm is applied to the virtual node. A minimum weight node of the same category is substituted by the virtual node. When a circulation path exists, an edge having the greatest weight is dropped. Such processes are repeated until a virtual node is substituted by an actual node.

In addition, when a user suggests a relationship between a service and a category, the category is changed to a virtual node, and a minimum spanning tree may be calculated according to a relation between the virtual node and the service, and then the virtual node may be substituted by the service.

Third, when a user sets an order, a minimum spanning tree $T_i$ is generated, in which a root node is used as a first node and a leaf node is used as a next node with respect to a pair of $<a_{i-1}, a_i>$ of the set list $<a_1, a_2, a_3, \ldots>$. At this time, a sub tree is obtained via a prim's algorithm by removing all links proceeding towards the root node from a graph and then removing all links proceeding away from the leaf node from a graph. Then, a minimum spanning tree $T_i$ is generated as a virtual node $v_i$, and a tree $T_{i+1}$ connected to a next node $a_{i+1}$ is generated from the virtual node $v_i$, which is repeated. Through this, a minimum spanning tree is generated according to the order set by the user. While a node is further added in the graph, a recommendation list of mashup services is generated.

Fourth, when a user suggests a combination of a direct relationship and an order, connection satisfying the order between services like in the second case, and then an algorithm for generating a tree based on the order is applied like in the third case.

As described above, when a user suggests a list of various requests, an individual service, category or a service and a category, suggests a direct relationship between a service and a category, suggests an order of an individual service, a category or a service and a category, or suggests a combination of an individual service, a category, or a service and a category, a mashup service can be provided by appropriately generating a recommendation list.

The invention can also be embodied as computer readable codes on a computer readable recording medium. The computer readable recording medium is any data storage device that can store data which can be thereafter read by a computer system having a processor.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of generating a mashup graph, the method comprising:
    receiving a set of services and collecting application programmable interfaces (APIs) of the services;
    generating a mashup graph by using the collected APIs, according to information regarding connections between the APIs and weights between the APIs; and
    reflecting a user's request to the mashup graph, and generating and outputting a mashup list,
    wherein, when the user's request comprises a category, a virtual node corresponding to the category is generated, a mashup list is generated using a minimum spanning node including the virtual node,
    wherein each of the weights reflects at least one of a user's frequency of use of a service, a general frequency of use of a service and a recommended value of a service, and
    wherein the generating the mashup graph is performed by a processor.

2. The method of claim 1, wherein each of the weights is inversely proportional to the at least one of the user's frequency of use of a service, the general frequency of use of a service and the recommended value of a service.

3. The method of claim 1, wherein the APIs comprise open APIs.

4. An apparatus for generating a mashup graph, the apparatus comprising:
    a processor comprising:
        an interface collection unit which receives a set of services and collects application program interfaces (APIs) of the services;
        an input/output connection test engine which stores and outputs information regarding connections between the APIs and weights between the APIs; and
        a mashup graph generating unit which generates a mashup graph in which a user's request is reflected by using the collected APIs, according to the information regarding the connections and the weights, which is provided by the input/output connection test engine,
    wherein when the user's request comprises a category, the mashup list generating unit generates a virtual node corresponding to the category and generating a mashup list by using a minimum spanning node including the virtual node, and
    wherein each of the weights reflects at least one of a user's frequency of use of a service, a general frequency of use of a service, and a recommended value of a service.

5. A method of recommending a mashup service, the method comprising:
    (a) receiving a set of services and collecting application program interfaces (APIs) of the services; and
    (b) generating a mashup graph by using the collected APIs, according to information regarding connections between the APIs and weights between the APIs; and
    (c) reflecting a user's request to the mashup graph, and generating and outputting a mashup list,
    wherein, when the user's request comprises a category, a virtual node corresponding to the category is generated, a mashup list is generated using a minimum spanning node including the virtual node, and
    wherein the generating the mashup graph is performed by a processor.

6. The method of claim 5, wherein the operation (c) comprises:
    calculating maximum weight spanning trees in which a sum of the weights is greatest; and selecting and calculating a maximum weight spanning tree in which the user's request is reflected, from among the maximum weight spanning trees, and outputting a calculated result as a mashup list.

7. The method of claim 6, further comprising collecting the user's request via a user's input.

8. The method of claim 7, wherein the user's request comprises at least one of a length of a mashup service, a maximum degree of a mashup service, a number of mashup services, information regarding an inclusion or an exclusion of a service and a sequence of services.

9. The method of claim 5, wherein the operation (c) comprises:
    calculating minimum weight spanning trees in which a sum of the weights is smallest; and
    selecting and calculating a minimum weight spanning tree in which the user's request is reflected, from among the minimum weight spanning trees, and outputting a calculated result as a mashup list.

10. The method of claim 9, wherein each of the weights is inversely proportional to at least one of a user's frequency of use of a service, a general frequency of use of a service and a recommended value of a service.

11. The method of claim 10, wherein a minimum spanning tree is generated according to the user's request from among the minimum weight spanning trees, and
    wherein a mashup list is generated using the minimum spanning tree.

12. The method of claim 10, wherein the user's request comprises cases where a list, a direct relationship or a combination of an individual service, a category, or a service and a category is suggested.

13. An apparatus for recommending a mashup service, the apparatus comprising:
    a processor comprising:
        an interface collection unit which receives a set of predetermined services and collects application program interfaces (APIs) of the services;
        a mashup graph generating unit which generates a mashup graph by using the collected APIs, according to information regarding connections between the APIs and weights between the APIs; and
        an authoring engine which calculates maximum weight spanning trees in which a sum of the weights is greatest in the generated mashup graph, selects and calculates a maximum weight spanning tree in which a user's request is reflected, from among the maximum weight spanning trees, and outputs a calculated result as a mashup list,
    wherein when the user's request comprises a category, the mashup list generating unit generates a virtual node corresponding to the category and generating a mashup list by using a minimum spanning node including the virtual node.

14. The apparatus of claim 13, wherein the authoring engine comprises:
    a user request collection unit which collects the user request via a user's input;
    a maximum weight spanning tree calculation unit which calculates the maximum weight spanning trees in which the sum of weights is the greatest in the generated mashup graph; and
    a mashup list generating unit which selects and calculates the maximum weight spanning tree in which the user's request is reflected, from among the maximum weight spanning trees, and outputs the calculated result as the mashup list.

15. The apparatus of claim 13, wherein the authoring engine comprises:
    a user request collection unit which collects the user's request via a user's input;
    a minimum weight spanning tree calculation unit which calculates minimum weight spanning trees in which the sum of weights is the smallest in the generated mashup graph; and
    a mashup list generating unit which selects and calculates a minimum weight spanning tree in which the user's request is reflected, from among the minimum weight spanning trees, and outputs the calculated result as the mashup list.

16. The apparatus of claim 15, wherein a minimum spanning tree is generated according to the user's request from among the minimum weight spanning trees, and
    wherein a mashup list is generated using the minimum spanning tree.

17. The apparatus of claim 16, wherein the user's request comprises cases where a list, a direct relationship or a combination of an individual service, a category, or a service and a category is suggested.

* * * * *